United States Patent
Wang et al.

(10) Patent No.: US 10,678,918 B1
(45) Date of Patent: *Jun. 9, 2020

(54) EVALUATING MALWARE IN A VIRTUAL MACHINE USING COPY-ON-WRITE

(71) Applicant: Palo Alto Networks, Inc., Santa Clara, CA (US)

(72) Inventors: Xinran Wang, San Ramon, CA (US); Huagang Xie, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 15/890,198

(22) Filed: Feb. 6, 2018

Related U.S. Application Data (63) Continuation of application No. 13/954,860, filed on Jul. 30, 2013, now Pat. No. 10,019,575.

(51) Int. Cl.
  *H04L 29/06* (2006.01)
  *G06F 21/56* (2013.01)
  *G06F 9/455* (2018.01)

(52) U.S. Cl.
  CPC ........ *G06F 21/565* (2013.01); *G06F 9/45533* (2013.01)

(58) Field of Classification Search
  CPC .................. G06F 2009/45562; H04L 63/14
  See application file for complete search history.

(56) References Cited

U.S. PATENT DOCUMENTS

| | | | |
|---|---|---|---|
| 5,983,348 A | 11/1999 | Ji | |
| 7,409,718 B1 | 8/2008 | Hong | |
| 7,475,002 B1 | 1/2009 | Mann | |
| 7,496,963 B2 | 2/2009 | Shipp | |
| 7,568,233 B1 | 7/2009 | Szor | |
| 7,603,713 B1 | 10/2009 | Belov | |
| 7,649,838 B2 | 1/2010 | Fishteyn | |
| 7,664,855 B1 | 2/2010 | Freed | |
| 7,779,472 B1 | 8/2010 | Lou | |
| 7,805,379 B1 | 9/2010 | Adkins, III | |
| 7,823,202 B1 | 10/2010 | Nucci | |

(Continued)

FOREIGN PATENT DOCUMENTS

| | | |
|---|---|---|
| WO | WO-2012134584 A1 | 10/2012 |
| WO | WO-2013067505 A1 | 5/2013 |

(Continued)

OTHER PUBLICATIONS

Author Unknown, A Day in the Life of a BotArmy, Damballa, 2008.

(Continued)

*Primary Examiner* — Jason K Gee (74) *Attorney, Agent, or Firm* — Van Pelt, Yi & James LLP (57) ABSTRACT

Evaluating a potentially malicious sample using a copy-on-write overlay is disclosed. A first virtual machine instance is initialized as a copy-on-write overlay associated with an original virtual machine image. The first virtual machine image is started and a first sample is executed. A second virtual machine instance is initialized as a copy-on-write overlay associated with a second original virtual machine image. The second virtual machine image is started and a second sample is executed. The first and second samples are executed at an overlapping time.

25 Claims, 4 Drawing Sheets

(56) References Cited

U.S. PATENT DOCUMENTS

| | | |
|---|---|---|
| 7,870,610 B1 | 1/2011 | Mitchell |
| 7,930,273 B1 | 4/2011 | Clark |
| 7,945,908 B1 | 5/2011 | Waldspurger |
| 7,958,555 B1 | 6/2011 | Chen |
| 8,011,010 B2 | 8/2011 | Michael |
| 8,141,132 B2 | 3/2012 | Oliver |
| 8,151,352 B1 | 4/2012 | Novitchi |
| 8,201,246 B1 | 6/2012 | Wu |
| 8,209,680 B1 | 6/2012 | Le |
| 8,225,317 B1 | 7/2012 | Chiueh |
| 8,239,492 B2 | 8/2012 | Pottenger |
| 8,239,608 B1 | 8/2012 | Ginzton |
| 8,260,914 B1 | 9/2012 | Ranjan |
| 8,291,468 B1 | 10/2012 | Chickering |
| 8,316,440 B1 | 11/2012 | Hsieh |
| 8,321,936 B1 | 11/2012 | Green |
| 8,347,100 B1 | 1/2013 | Thornewell |
| 8,359,651 B1 | 1/2013 | Wu |
| 8,364,664 B2 | 1/2013 | Bennett |
| 8,370,938 B1 | 2/2013 | Daswani |
| 8,402,529 B1 | 3/2013 | Green |
| 8,402,543 B1 | 3/2013 | Ranjan |
| 8,407,324 B2 | 3/2013 | McDougal |
| 8,438,639 B2 | 5/2013 | Lee |
| 8,443,363 B1 | 5/2013 | Brennan, III |
| 8,443,449 B1 | 5/2013 | Fan |
| 8,464,341 B2 | 6/2013 | Cohen |
| 8,479,295 B2 | 7/2013 | Sahita |
| 8,484,732 B1 | 7/2013 | Chen |
| 8,484,739 B1 | 7/2013 | Seshadri |
| 8,495,742 B2 | 7/2013 | Abadi |
| 8,510,827 B1 | 8/2013 | Leake |
| 8,516,591 B2 | 8/2013 | Fly |
| 8,521,667 B2 | 8/2013 | Zhu |
| 8,533,842 B1 | 9/2013 | Satish |
| 8,539,577 B1 | 9/2013 | Stewart |
| 8,566,928 B2 | 10/2013 | Dagon |
| 8,566,946 B1 | 10/2013 | Aziz |
| 8,572,740 B2 | 10/2013 | Mashevsky |
| 8,578,481 B2 | 11/2013 | Rowley |
| 8,584,239 B2 | 11/2013 | Aziz |
| 8,631,489 B2 | 1/2014 | Antonakakis |
| 8,646,071 B2 | 2/2014 | Pereira |
| 8,646,088 B2 | 2/2014 | Pistoia |
| 8,656,491 B1 | 2/2014 | Daswani |
| 8,677,487 B2 | 3/2014 | Balupari |
| 8,683,584 B1 | 3/2014 | Daswani |
| 8,707,441 B1 | 4/2014 | Cidambi |
| 8,726,386 B1 | 5/2014 | McCorkendale |
| 8,756,691 B2 | 6/2014 | Nachenberg |
| 8,763,071 B2 | 6/2014 | Sinha |
| 8,763,125 B1 | 6/2014 | Feng |
| 8,806,647 B1 | 8/2014 | Daswani |
| 8,813,240 B1 | 8/2014 | Northup |
| 8,826,426 B1 | 9/2014 | Dubey |
| 8,838,570 B1 | 9/2014 | English |
| 8,863,288 B1 | 10/2014 | Savage |
| 8,893,124 B2 | 11/2014 | Bork |
| 8,931,088 B2 | 1/2015 | Chen |
| 8,966,625 B1 | 2/2015 | Zuk |
| 9,003,526 B2 | 4/2015 | El-Moussa |
| 9,049,221 B1 | 6/2015 | Yen |
| 9,117,079 B1 | 8/2015 | Huang |
| 9,141,801 B2 | 9/2015 | Moon |
| 9,152,694 B1 | 10/2015 | Padidar |
| 9,165,142 B1 | 10/2015 | Sanders |
| 9,183,383 B1 | 11/2015 | Yablokov |
| 9,213,838 B2 | 12/2015 | Lu |
| 9,223,962 B1 * | 12/2015 | Kashyap ............... G06F 21/566 |
| 9,245,121 B1 | 1/2016 | Luo |
| 9,294,486 B1 | 3/2016 | Chiang |
| 9,317,680 B2 | 4/2016 | Carter, III |
| 9,361,089 B2 | 6/2016 | Bradfield |
| 9,516,039 B1 | 12/2016 | Yen |
| 9,516,053 B1 | 12/2016 | Muddu |
| 9,591,003 B2 | 3/2017 | Johansson |
| 9,626,509 B1 | 4/2017 | Khalid |
| 9,792,430 B2 | 10/2017 | Golshan |
| 9,852,290 B1 | 12/2017 | Kirk |
| 10,019,575 B1 | 7/2018 | Wang |
| 2003/0191911 A1 | 10/2003 | Kleinschnitz |
| 2004/0030913 A1 | 2/2004 | Liang |
| 2004/0107416 A1 | 6/2004 | Buban |
| 2004/0133796 A1 | 7/2004 | Cohen |
| 2005/0149726 A1 | 7/2005 | Joshi |
| 2005/0177602 A1 | 8/2005 | Kaler |
| 2005/0240756 A1 | 10/2005 | Mayer |
| 2005/0283837 A1 | 12/2005 | Olivier |
| 2006/0021029 A1 | 1/2006 | Brickell |
| 2006/0168024 A1 | 7/2006 | Mehr |
| 2007/0039053 A1 | 2/2007 | Dvir |
| 2007/0050850 A1 | 3/2007 | Katoh |
| 2007/0055711 A1 | 3/2007 | Polyakov |
| 2007/0079375 A1 | 4/2007 | Copley |
| 2007/0106986 A1 | 5/2007 | Worley, Jr. |
| 2007/0174915 A1 | 7/2007 | Gribble |
| 2007/0192857 A1 | 8/2007 | Ben-Itzhak |
| 2007/0261112 A1 | 11/2007 | Todd |
| 2008/0016552 A1 | 1/2008 | Hart |
| 2008/0127338 A1 | 5/2008 | Cho |
| 2008/0155694 A1 | 6/2008 | Kwon |
| 2008/0177755 A1 | 7/2008 | Stern |
| 2008/0177994 A1 | 7/2008 | Mayer |
| 2008/0209562 A1 | 8/2008 | Szor |
| 2008/0229393 A1 | 9/2008 | Congdon |
| 2008/0256633 A1 | 10/2008 | Arnold |
| 2008/0262991 A1 | 10/2008 | Kapoor |
| 2008/0263658 A1 | 10/2008 | Michael |
| 2008/0263659 A1 | 10/2008 | Alme |
| 2008/0320594 A1 | 12/2008 | Jiang |
| 2009/0007100 A1 * | 1/2009 | Field ...................... G06F 21/53 718/1 |
| 2009/0019547 A1 | 1/2009 | Palliyil |
| 2009/0036111 A1 | 2/2009 | Danford |
| 2009/0055928 A1 | 2/2009 | Kang |
| 2009/0077383 A1 | 3/2009 | De Monseignat |
| 2009/0144826 A2 | 6/2009 | Piccard |
| 2009/0150419 A1 | 6/2009 | Kim |
| 2009/0235357 A1 | 9/2009 | Ebringer |
| 2009/0241190 A1 | 9/2009 | Todd |
| 2009/0254989 A1 | 10/2009 | Achan |
| 2009/0265786 A1 | 10/2009 | Xie |
| 2009/0282485 A1 | 11/2009 | Bennett |
| 2009/0288167 A1 | 11/2009 | Freericks |
| 2010/0037314 A1 | 2/2010 | Perdisci |
| 2010/0043072 A1 | 2/2010 | Rothwell |
| 2010/0077481 A1 | 3/2010 | Polyakov |
| 2010/0107252 A1 | 4/2010 | Mertoguno |
| 2010/0115586 A1 | 5/2010 | Raghavan |
| 2010/0154059 A1 | 6/2010 | McNamee |
| 2010/0162350 A1 | 6/2010 | Jeong |
| 2010/0175132 A1 | 7/2010 | Zawadowskiy |
| 2010/0281458 A1 | 11/2010 | Paladino |
| 2010/0333168 A1 | 12/2010 | Herrod |
| 2011/0041179 A1 | 2/2011 | Staahlberg |
| 2011/0055923 A1 | 3/2011 | Thomas |
| 2011/0090911 A1 | 4/2011 | Hao |
| 2011/0099620 A1 | 4/2011 | Stavrou |
| 2011/0161955 A1 | 6/2011 | Woller |
| 2011/0167495 A1 | 7/2011 | Antonakakis |
| 2011/0173698 A1 | 7/2011 | Polyakov |
| 2011/0185425 A1 | 7/2011 | Lee |
| 2011/0208714 A1 | 8/2011 | Soukal |
| 2011/0239299 A1 | 9/2011 | Chen |
| 2011/0252474 A1 | 10/2011 | Ward |
| 2011/0271342 A1 | 11/2011 | Chung |
| 2011/0276695 A1 | 11/2011 | Maldaner |
| 2011/0283360 A1 | 11/2011 | Abadi |
| 2011/0296412 A1 | 12/2011 | Banga |
| 2011/0296486 A1 | 12/2011 | Burch |
| 2012/0042381 A1 | 2/2012 | Antonakakis |
| 2012/0054869 A1 | 3/2012 | Yen |
| 2012/0079596 A1 | 3/2012 | Thomas |
| 2012/0084860 A1 | 4/2012 | Cao |

(56) References Cited

U.S. PATENT DOCUMENTS

| | | |
|---|---|---|
| 2012/0089700 A1 | 4/2012 | Safruti |
| 2012/0096549 A1 | 4/2012 | Amini |
| 2012/0110174 A1 | 5/2012 | Wootton |
| 2012/0117650 A1 | 5/2012 | Nachenberg |
| 2012/0117652 A1 | 5/2012 | Manni |
| 2012/0192274 A1 | 7/2012 | Odom |
| 2012/0233691 A1 | 9/2012 | Jiang |
| 2012/0240183 A1 | 9/2012 | Sinha |
| 2012/0240224 A1 | 9/2012 | Payne |
| 2012/0255018 A1 | 10/2012 | Sallam |
| 2012/0255019 A1 | 10/2012 | McNamee |
| 2012/0255021 A1 | 10/2012 | Sallam |
| 2012/0255031 A1 | 10/2012 | Sallam |
| 2012/0278889 A1 | 11/2012 | El-Moussa |
| 2012/0291042 A1 | 11/2012 | Stubbs |
| 2012/0291131 A1 | 11/2012 | Turkulainen |
| 2013/0007245 A1 | 1/2013 | Malik |
| 2013/0014259 A1 | 1/2013 | Gribble |
| 2013/0047147 A1 | 2/2013 | McNeill |
| 2013/0055394 A1 | 2/2013 | Beresnevichiene |
| 2013/0091350 A1 | 4/2013 | Gluck |
| 2013/0091570 A1 | 4/2013 | McCorkendale |
| 2013/0091571 A1 | 4/2013 | Lu |
| 2013/0104230 A1 | 4/2013 | Tang |
| 2013/0117848 A1 | 5/2013 | Golshan |
| 2013/0117852 A1 | 5/2013 | Stute |
| 2013/0122861 A1 | 5/2013 | Kim |
| 2013/0145002 A1 | 6/2013 | Kannan |
| 2013/0145008 A1 | 6/2013 | Kannan |
| 2013/0152200 A1 | 6/2013 | Alme |
| 2013/0160130 A1 | 6/2013 | Mendelev |
| 2013/0191915 A1 | 7/2013 | Antonakakis |
| 2013/0212684 A1 | 8/2013 | Li |
| 2013/0227165 A1 | 8/2013 | Liu |
| 2013/0232574 A1 | 9/2013 | Carothers |
| 2013/0246685 A1 | 9/2013 | Bhargava |
| 2013/0298184 A1 | 11/2013 | Ermagan |
| 2013/0298192 A1 | 11/2013 | Kumar |
| 2013/0298230 A1 | 11/2013 | Kumar |
| 2013/0298242 A1 | 11/2013 | Kumar |
| 2013/0298243 A1 | 11/2013 | Kumar |
| 2013/0298244 A1 | 11/2013 | Kumar |
| 2013/0326625 A1 | 12/2013 | Anderson |
| 2013/0347094 A1 | 12/2013 | Bettini |
| 2014/0006734 A1 | 1/2014 | Li |
| 2014/0059641 A1 | 2/2014 | Chapman, II |
| 2014/0096131 A1 | 4/2014 | Sonnek |
| 2014/0130158 A1 | 5/2014 | Wang |
| 2014/0189862 A1 | 7/2014 | Kruglick |
| 2014/0283037 A1 | 9/2014 | Sikorski |
| 2014/0337836 A1* | 11/2014 | Ismael .................... G06F 9/455 718/1 |
| 2014/0351935 A1 | 11/2014 | Shao |
| 2014/0380474 A1 | 12/2014 | Paithane |
| 2015/0047033 A1 | 2/2015 | Thomas |
| 2015/0058984 A1 | 2/2015 | Shen |
| 2015/0067673 A1 | 3/2015 | Wang |
| 2015/0067862 A1 | 3/2015 | Yu |
| 2015/0074810 A1 | 3/2015 | Saher |
| 2015/0096025 A1 | 4/2015 | Ismael |
| 2015/0195299 A1 | 7/2015 | Zoldi |
| 2015/0199207 A1 | 7/2015 | Lin |
| 2016/0036836 A1 | 2/2016 | Grill |
| 2016/0099951 A1 | 4/2016 | Kashyap |
| 2016/0342787 A1 | 11/2016 | Wang |
| 2017/0323102 A1 | 11/2017 | Manadhata |

FOREIGN PATENT DOCUMENTS

| | | |
|---|---|---|
| WO | WO-2013067508 | 5/2013 |
| WO | WO-2013134206 A1 | 9/2013 |

OTHER PUBLICATIONS

Author Unknown, Advanced Persistent Threats (APT), What's an APT? A Brief Definition, Damballa, Dec. 14, 2010.

Author Unknown, Anatomy of a Targeted Attack, Damballa, Dec. 3, 2008.

Author Unknown, AV, IDS/IPS and Damballa's Response to Targeted Attacks, A Technology Comparison, Damballa, Nov. 2008.

Author Unknown, Closed Window, How Failsafe Enhancements Dramatically Limit Opportunities for Malware Armies and other Targeted Attacks, Damballa, Sep. 23, 2009.

Author Unknown, Damballa: A Different Approach, Targeted Attacks Requires a New Solution, Damballa, Sep. 23, 2008.

Author Unknown, Damballa's In-The-Cloud Security Model, Enterprise Protection Moves Beyond the Network Perimeter, Damballa, Aug. 24, 2008.

Author Unknown, Executive Overview, The Command Structure of the Aurora Botnet, Damballa, Mar. 2010.

Author Unknown, FireEye Malware Analysis, FireEye.com, FireEye, Inc., 2010.

Author Unknown, How to Be a Hero in the War Against BotArmies, Damballa, 2008.

Author Unknown, 'Hybrid Sandboxing for Detecting and Analyzing Advanced and Unknown Malware', Blue Coat Systems, Inc., Nov. 2013.

Author Unknown, Layer 8, How and Why Targeted Attacks Exploit Your Users, Damballa, Nov. 2011.

Author Unknown, 'Multi-Vector Virtual Execution (MVX) Engine', FireEye, Inc., http://www.fireeye.com/products-and-solutions/virtual-execution-engine.html, Jun. 2014.

Author Unknown, Targeted Attacks for Fun and Profit, An Executed Guide to a New and Growing Enterprise Threat, Damballa, Oct. 13, 2008.

Author Unknown, Trust Betrayed, What to Do When a Targeted Attack Turns Your Networks Against You, Damballa, Feb. 22, 2008.

Author Unknown, Updated on the Enemy, A Deconstruction of Who Profits From Botnets, Damballa, May 13, 2009.

Barr, The VMware Mobile Virtualization Platform: Is that a Hypervisor in your Pocket?, Dec. 2010, VMware, p. 124-135.

Binkley et al., An Algorithm for Anomaly-based Botnet Detection, Jul. 2006.

Chen et al., Chapter 4: Guarding Against Network Intrusions, Network and System Security, Elsevier Inc., Feb. 2009, 5 pages.

Davidoff et al., 'Chapter 12: Malware Forensics,' Network Forensics: Tracking Hackers Through Cyberspace, Pearson Education Inc., Jun. 2012, 60 pages.

Dittrich et al., P2P as Botnet Command and Control; A Deeper Insight, 2008 3rd International Conference on Malicious and Unwanted Software (Malware), Oct. 2008, IEEE, vol. 10, pp. 41-48.

Giroire et al., Exploiting Temporal Persistence to Detect Convert Botnet Channels, Sep. 2009.

Goebel et al., Rishi: Identify Bot Contaminated Hosts by IRC Nickname Evaluation, Apr. 2007.

Gu et al., BotHunter: Detecting Malware Infection Through IDS-Driven Dialog Correlation, Aug. 2007.

Gu et al., BotMiner: Clustering Analysis of Network Traffic for Protocol- and Structure-Independent Botnet Detection, Jul. 2008.

Gu et al., BotSniffer: Detecting Botnet Command and Control Channels in Network Traffic, Feb. 2008.

Gunter Ollmann, Botnet Communication Topologies, Understanding the Intricacies of Bonet Command and Control, Damballa, Jun. 2009.

Gunter Ollmann, Extracting CnC from Malware, The Role of malware Sample Analysis in Botnet Detection, Damballa, Dec. 8, 2009.

Gunter Ollmann, Serial Variant Evasion Tactics, Techniques Used to Automatically Bypass Antivirus Technologies, Damballa, Oct. 7, 2009.

Gunter Ollmann, The Botnet vs. Malware Relationship, The One to one Botnet Myth, Damballa, Jun. 2009.

Gunter Ollmann, The Opt-In Botnet Generation, Hacktivism and Centrally Controlled Protesting, Social Networks, Damballa, Apr. 26, 2010.

(56) References Cited

OTHER PUBLICATIONS

Karagiannis et al., BLINC: Multilevel Traffic Classification in the Dark, ACM SIGCOMM Computer Communication Review, Retrieved From https://www.microsoft.com/en-us/research/wp-content/uploads/2016/02/BLINC_TR.pdf, published 2005.

Karasaridis, Anestis et al., Wide-scale Botnet Detection and Characterization, Dec. 14, 2010.

Landecki, Grzegorz, Detecting Botnets, Linux Journal, Jan. 1, 2009.

Lau et al., 'Measuring Virtual Machine Detection in Malware using DSD Tracer', Sophoslabs, Journal in Computer Virology, Aug. 2008.

Ligh et al., 'Chapter 5: Researching Domains and IP Addresses,' Malware Analyst's Cookbook, John Wiley & Sons, Nov. 2010, 38 pages.

Lindorfer et al., 'Detecting Enviroment-Sensitive Malware', Recent Advances in Intrusion Detection. Springer Berlin Heidelberg, Jan. 2011.

Livadas et al., Using Machine Learning Techniques to Identify Botnet Traffic, BBN Technologies, Nov. 2006.

Nazario et al., As the Net Churns: Fast-Flux Botnet Observations, IEEE, pp. 24-31, Sep. 5, 2008.

Paul Royal, Analysis of the Kraken Botnet, Damballa, Apr. 9, 2008.

Rajab et al., 'A Multifaceted Approach to Understanding the Botnet Phenonmenon,' Proceedings of the 6th ACM SIGCOMM Conference on Internet Measurement, Oct. 2006, 12 pages.

Ramachandran, Anirudh et al., Revealing Botnet Membership Using DNSBL Counter-Intelligence, Jul. 7, 2006.

Russ White, 'High Availability in Routing', Mar. 2004, Cisco Systems, vol. 7, Issue 1, pp. 2-14.

Schechter et al., 'Fast Detection of Scanning Worm Infections,' Recent Advances in Intrusion Detection: 7th International Symposium RAID 2004 Proceedings, Jan. 2004, 24 pages.

Shabtai et al., Andromaly: A Behavioral Malware Detection Framework for Android Devices, J Intell Inf Syst (2012) 38:161-190, Springer, Jan. 6, 2011.

Sikorski et al., 'Chapter 14: Malware-Focused Network Signatures,' Practical Malware Anlaysis, No Starch Press, Feb. 2012, 13 pages.

Singh et al., 'Hot Knives Through Butter: Evading File-based Sandboxes', FireEye, Inc., Feb. 2014.

Strayer et al. Detecting Botnets with Tight Command and Control, BBN Technologies, 2006.

Sun et al, Malware Virtualization-resitant behavior detection, 2011 IEEE, pp. 912-917.

Van Der Heide et al., 'DNS Anomaly Detection,' System and Network Engineering Research Group, University of Amsterdam, Feb. 6, 2011, 20 pages.

Wagener et al., 'An Instrumented Analysis of Unknown Software and Malware Driven by Free Libre Open Source Software', Signal Image Technology and Internet Based Systems, 2008. SITIS'08. IEEE International Conference on. IEEE, Nov. 2008.

Yadav et al., 'Detecting Algorithmically Generated Malicious Domain Names', Nov. 2010.

Yen, Ting-Fang et al., Traffic Aggregation for Malware Detection, Jul. 2008.

Zang et al., Botnet Detection Through Fine Flow Classification, CSE Dept., Technical Report No. CSE11-001, p. 1-17, Jan. 31, 2011.

Blasing et al., An Android Application Sandbox System for Suspicious Software Detection, Malicious and Unwanted Software (Malware), 2010 5th International Conferences on IEEE, 2010.

Chen et al., Software-Defined Mobile Networks Security, Mobile Netw Appl, (2016), 21:729-743, Jan. 9, 2016.

Li et al., "DroidBot: A Lightweight UI-Guided Test Input Generator for Android", 2017.

Liu et al., An Automatic UI Interaction Script Generator for Android Applications Using Activity Call Graph Analysis. Eurasia Journal of Mathematics, Science and Technology Education, 14(7), 3159-3179. 2018.

Min et al., Runtime-Based Behavior Dynamic Analysis System for Android Malware Detection, Atlantis Press, ICCIA 2012, Dec. 2012.

Rastogi et al., AppsPlayground: Automatic Security Analysis of Smartphone Applications, ACM, Feb. 2013.

Spreitzenbarth et al., "Mobile-Sandbox: Having a Deeper Look into Android Applications", from Proceedings of the 28th Annual ACM Symposium on Applied Computing, pp. 1808-1815, Mar. 2013.

Sylve et al., "Acquisition and analysis of volatile memory from android devices." Digital Investigation 8.3-4, pp. 175-184. 2012.

Zheng et al., "SmartDroid: An Automatic System for Revealing UI-based Trigger Conditions in Android Applications", Oct. 19, 2012.

Zhou et al., Dissecting Android Malware: Characterization and Evolution, IEEE, 2012.

Zou et al., Detecting Malware Based on DNS Graph Mining, Hindawi Publishing Corporation, International Journal of Distributed Sensor Networks, vol. 2015, pp. 1-12, Apr. 17, 2015.

\* cited by examiner

EVALUATING MALWARE IN A VIRTUAL MACHINE USING COPY-ON-WRITE

CROSS-REFERENCE TO OTHER APPLICATIONS

This application is a continuation of co-pending U.S. patent application Ser. No. 13/954,860 entitled EVALUATING MALWARE IN A VIRTUAL MACHINE USING COPY-ON-WRITE filed Jul. 30, 2013 which is incorporated herein by reference for all purposes.

BACKGROUND OF THE INVENTION

Nefarious individuals attempt to compromise computer systems in a variety of ways. As an example, such individuals may embed or otherwise include malicious software ("malware") in email attachments and transmit or cause them to be transmitted to unsuspecting users. An administrator of the recipient computer system can attempt to prevent compromise by blocking all downloads of all attachments by the computer system. However, such a policy will also prevent legitimate attachments from being available to the user. As an alternate approach, the administrator can require that a security scan be performed prior to the download of an attachment. Unfortunately, malware authors are crafting increasingly sophisticated malware that is increasingly able to evade detection. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
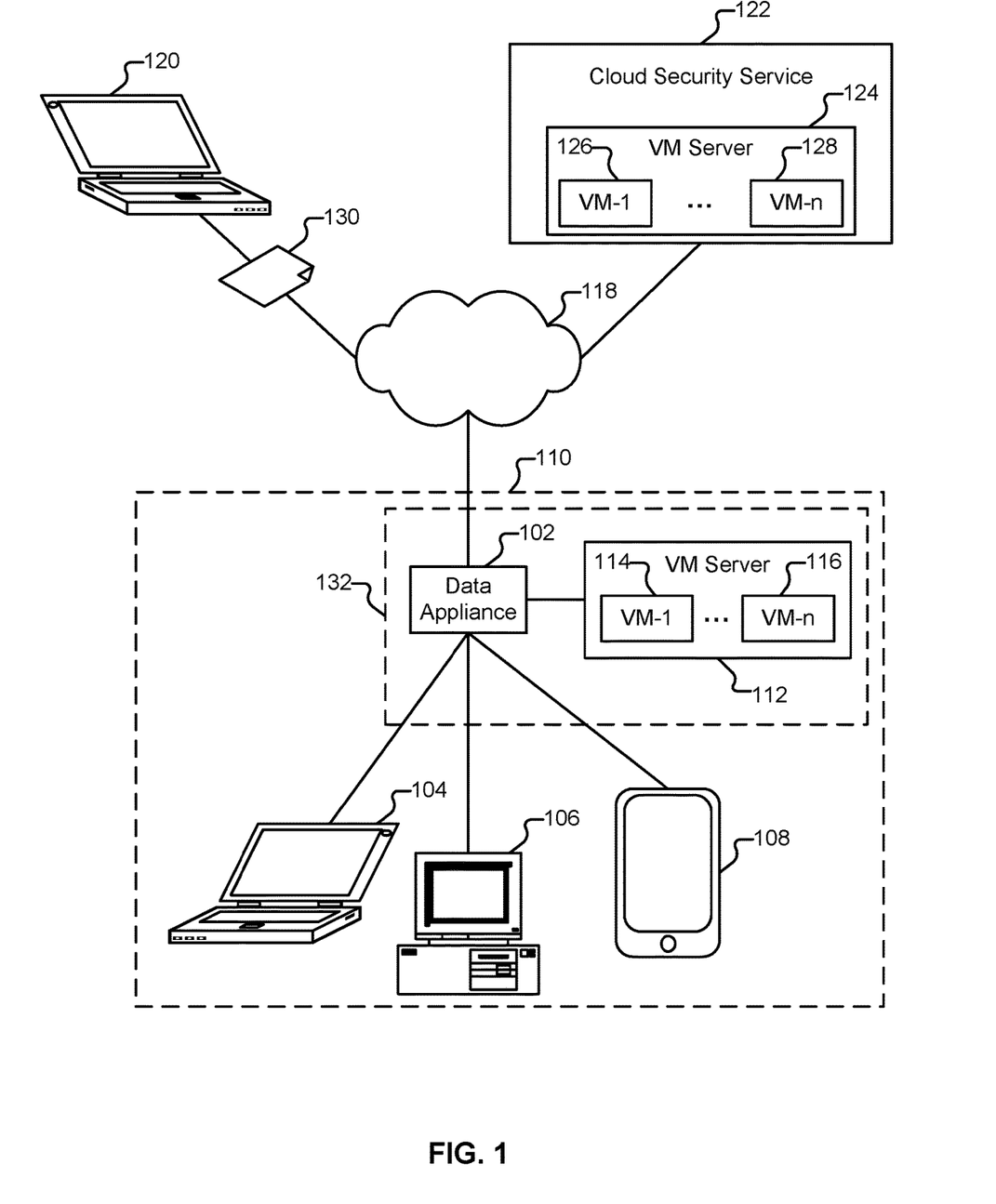
FIG. 1 illustrates an example of an environment in which malware is detected and prevented from causing harm.

FIG. 1 illustrates an example of an environment in which malware is detected and prevented from causing harm. In particular, a variety of attempts by a malicious individual to propagate malware (such as malware 130) via system 120 are described, as are techniques for thwarting that propagation.

In the example shown in FIG. 1, client devices 104-108 are a laptop computer, a desktop computer, and a tablet (respectively) present in an enterprise network 110 (belonging to the "Acme Company"). Data appliance 102 is configured to enforce policies regarding communications between clients, such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110.

Appliance 102 can take a variety of forms. For example, appliance 102 can be a dedicated device or set of devices. The functionality provided by appliance 102 can also be integrated into or executed as software on a general purpose computer, a computer server, a gateway, and/or a network/routing device. In some embodiments services provided by data appliance 102 are instead (or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

As will be described in more detail below, appliance 102 can be configured to work in cooperation with one or more virtual machine servers (112, 124) to perform malware analysis/prevention. As one example, data appliance 102 can be configured to provide a copy of malware 130 to one or more of the virtual machine servers for real-time analysis. As another example, service 122 can provide a list of signatures of known-malicious documents to appliance 102 as part of a subscription. Those signatures can be generated by service 122 in conjunction with the techniques described herein.

An example of a virtual machine server is a physical machine comprising commercially available server-class hardware (e.g., a multi-core processor, 64+ Gigabytes of RAM, and one or more Gigabit network interface adapters) that runs commercially available virtualization software, such as VMware ESXi, Citrix XenServer, Kernel Based Virtual Machine (KVM), or Microsoft Hyper-V. The virtual machine servers can be separate from, but in communication with, data appliance 102, as shown in FIG. 1. A virtual machine server can also perform some or all of the functions of data appliance 102, and a separate data appliance 102 is omitted as applicable. Further, a virtual machine server can be under the control of the same entity that administers data appliance 102 (e.g., virtual machine server 112); the virtual machine server can also be provided by a third party (e.g., virtual machine server 124, which can be configured to provide services to appliance 102 via third party service 122). In some embodiments, data appliance 102 is configured to use one or the other of virtual machine servers 112 and 124 for malware analysis. In other embodiments, data appliance 102 is configured to use the services of both servers (and/or additional servers not pictured).

Figure 2:
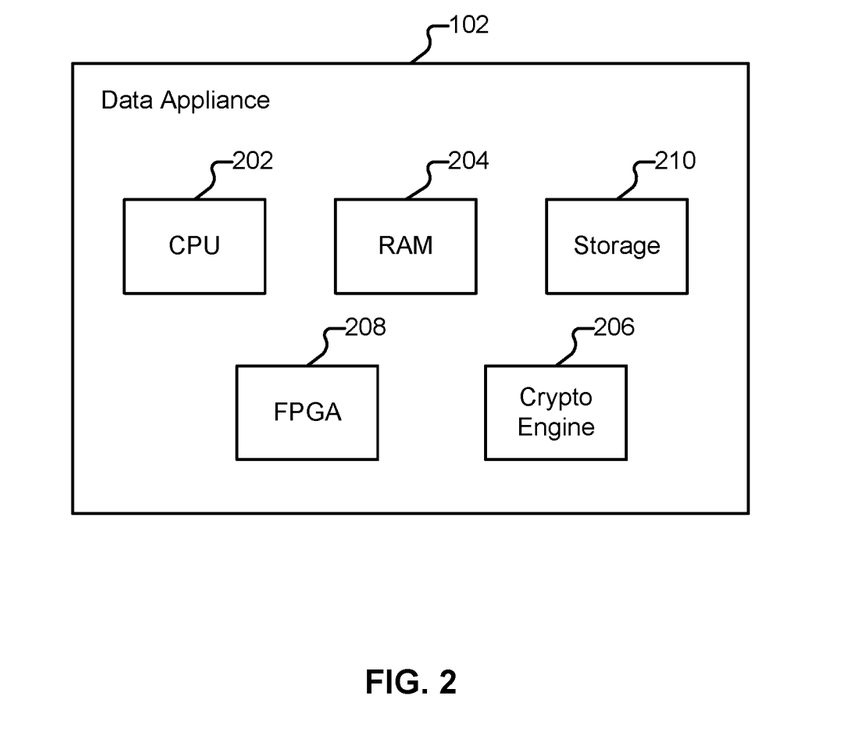
FIG. 2 illustrates an embodiment of a data appliance.

FIG. 2 illustrates an embodiment of a data appliance. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Using Virtual Machines to Analyze Files

A virtual machine (VM) can be used to perform behavior profiling (e.g., in a VM sandbox environment) using various heuristic-based analysis techniques that can be performed in real-time during a file transfer (e.g., during an active file/attachment download) and/or on files previously collected (e.g., a collection of files submitted for batch analysis). Documents, executables, and other forms of potentially malicious software (e.g., to be evaluated) are referred to herein as "samples."

Suppose a malicious user of system 120 sends an email message to a user of client 104 that includes a malicious attachment. The attachment may be an executable (e.g., having a .exe extension) and may also be a document (e.g., a .doc or .pdf file). The message is received by data appliance 102, which determines whether a signature for the attachment is present on data appliance 102. A signature, if present, can indicate that the attachment is known to be safe, and can also indicate that the attachment is known to be malicious. If no signature for the attachment is found, data appliance 102 is configured to provide the attachment to a virtual machine server, such as virtual machine server 112, for analysis.

Virtual machine server 112 is configured to execute (or open in an application, as applicable) the attachment in one or more virtual machines 114-116. The virtual machines may all execute the same operating system (e.g., Microsoft Windows XP SP 3), may execute different operating systems, and/or may collectively execute combinations of operating systems (and/or versions thereof) (e.g., with VM 116 emulating an Android operating system). In some embodiments, the VM(s) chosen to analyze the attachment are selected to match the operating system of the intended recipient of the attachment being analyzed (e.g., where the operating system of client 104 is Microsoft Windows XP SP 2). Observed behaviors resulting from executing/opening the attachment (such as changes to certain platform, software, or registry settings) are logged and analyzed for indications that the attachment is malicious. In some embodiments the log analysis is performed by the VM server (e.g., VM server 112). In other embodiments, the analysis is performed at least in part by appliance 102. The malware analysis and enforcement functionality illustrated in FIG. 1 as being provided by data appliance 102 and VM server 112 is also referred to herein as being provided by malware analysis system 132. As explained above, portions of malware analysis system 132 may be provided by multiple distinct devices, but may also be provided on a single platform, as applicable. For example, the functionality described herein (or portions thereof) as being provided herein by malware analysis system 132 can also be provided by cloud security service 122.

If the attachment is determined to be malicious, appliance 102 can automatically block the file download based on the analysis result. Further, a signature can be generated and distributed (e.g., to other data appliances, and/or to cloud security service 122) to automatically block future file transfer requests to download the file determined to be malicious.

Configuring and Virtual Machine Instances

Malware often leverages exploits that are specific to a particular system configuration or set of system configurations. For example, malware 130 might be able to successfully compromise a computer system running Windows XP SP 3 (e.g., running on client 104), but be unable to compromise a computer system running any versions of Windows 7 (e.g., running on client 106). If the only virtual machine used to evaluate malware 130 is a Windows 7 image, the malicious nature of malware 130 might not be discovered. As another example, malware 130 might be able to successfully compromise a system upon which a particular combination of software is installed (e.g., a specific version of Internet Explorer with a specific version of Java). If the only virtual machine image(s) used to evaluate malware 130 include only one but not both applications, or include different versions of those applications, the malicious nature of malware 130 might not be discovered.

Some computing environments are relatively homogenous. For example, every employee at a startup might be issued the same laptop, running the same operating system, and with the same base applications installed. More typically, however, a range of different platforms and configurations is supported (e.g., in an enterprise environment). Further, certain employees (e.g., in the Finance Department) may need access to additional software (e.g., Microsoft Access) not included on the systems of other users. And, employees are often allowed to customize their systems, e.g., by adding or removing software.

Suppose malware 130 targets Microsoft Windows systems. Further suppose that the IT Department of Acme Company supports the following: Windows XP SP 3 and 64-bit Windows 7 installations, with either Internet Explorer 9 or 10, and any of Microsoft Office 2003, 2007, and 2010 installed. An Acme Company employee may thus potentially be opening malware 130 on any of twelve different officially supported Windows system configurations. Using the techniques described herein, malware analysis system 132 can efficiently evaluate malware 130 using twelve virtual machine instances (corresponding to each of the twelve potential system configurations) and will be able to detect that malware 130 is malicious. Further, as will be described in more detail below, runtime customizations can efficiently be made to those virtual machine instances (e.g., to efficiently test customized systems).

Copy-On-Write

One approach to providing each of the twelve different types of Windows emulation environments is to create a full virtual machine image for each configuration. In that scenario, virtual machine server 112 could be configured to store twelve full images, for each of the following, respectively:

Windows XP SP3, Microsoft Office 2003, Internet Explorer 9
Windows XP SP3, Microsoft Office 2007, Internet Explorer 9
Windows XP SP3, Microsoft Office 2010, Internet Explorer 9
Windows XP SP3, Microsoft Office 2003, Internet Explorer 10
Windows XP SP3, Microsoft Office 2007, Internet Explorer 10
Windows XP SP3, Microsoft Office 2010, Internet Explorer 10
Windows 7 64-bit, Microsoft Office 2003, Internet Explorer 9
Windows 7 64-bit, Microsoft Office 2007, Internet Explorer 9
Windows 7 64-bit, Microsoft Office 2010, Internet Explorer 9
Windows 7 64-bit, Microsoft Office 2003, Internet Explorer 10
Windows 7 64-bit, Microsoft Office 2007, Internet Explorer 10
Windows 7 64-bit, Microsoft Office 2010, Internet Explorer 10

A virtual machine executing malware is generally input/output bound, not CPU bound. By running the virtual machine in RAM, the input/output is reduced and the emulation can be performed significantly more quickly than where it is not run in RAM. Suppose each of the above full images occupies approximately 10G of disk space. Executing each of the images will accordingly require a minimum of approximately 10G of RAM, meaning virtual machine server 112 requires a minimum of 120G of RAM, just for the twelve images (e.g., to run in a RAM disk). Unfortunately, while some systems (e.g., server 124) might have sufficient resources to support the parallel execution of each of the images, such an amount of memory is potentially very costly, and/or may be infeasible to leverage (e.g., due to limits of memory bandwidth). For example, if server 112 is required execute dozens of malware samples at the same time, RAM requirements could potentially be thousands of gigabytes. The situation can be exacerbated if additional software is supported. For example, if the IT Department begins supporting Microsoft Office 2013, sixteen system configurations are thus supported by the IT department (and would correspond to sixteen images and 160G of RAM). If the IT Department instead begins supporting Windows 8, eighteen system configurations are thus supported by the IT department (and would correspond to eighteen images and 180G of RAM). As another example, if a service pack is released for an application (e.g., Microsoft Office 2010 is updated), each of the full images including that application will need to be regenerated (or otherwise obtained, e.g., downloaded from service 122).

An alternate approach to providing emulators for each of Acme Company's system configurations is to create each of the emulators as a copy-on-write overlay of a base image (or hierarchy of images, described in more detail below). The following example assumes that the "Quick EMUlator" (QEMU) is used by virtual machine server 112. Other hypervisors can also be used, as applicable, to provide an appropriate environment for evaluating malware.

Figure 3:
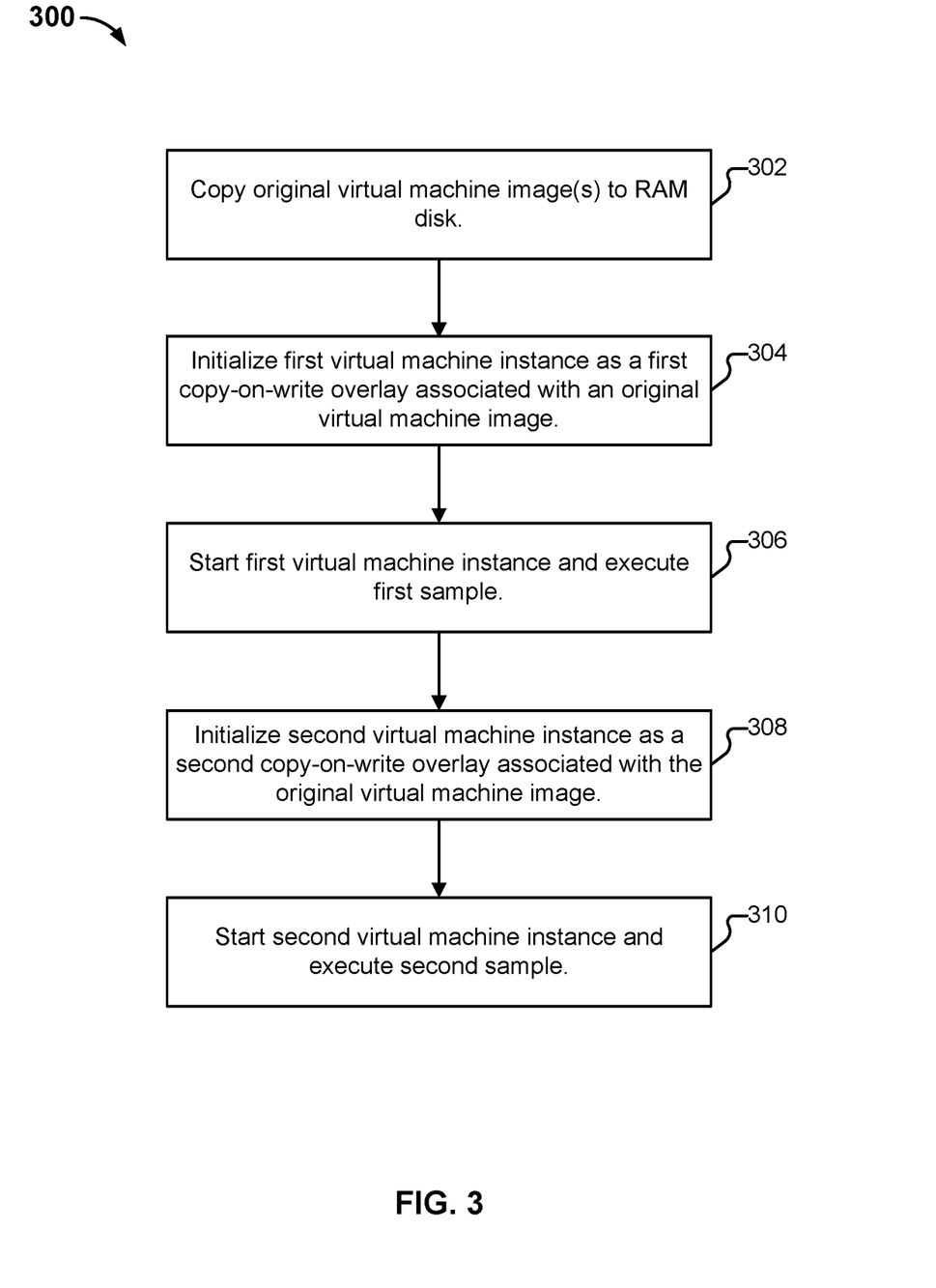
FIG. 3 illustrates an example of a process for using a copy-on-write overlay to evaluate a potentially malicious sample.

FIG. 3 illustrates an example of a process for using a copy-on-write overlay to evaluate a potentially malicious sample. In some embodiments, process 300 is performed on a virtual machine server, such as virtual machine server 124 or virtual machine server 112. At boot time (or another appropriate initialization time), a RAM disk is created on the virtual machine server. In some embodiments, the RAM disk is created using half of the available system RAM. Thus, a system having 64G of RAM has a 32G RAM disk created.

At 302, one or more original virtual machine images are copied to the RAM disk. Examples of such original virtual machine images include images reflecting a base installation of an operating system (e.g., Windows XP SP3 and 64-bit Windows 7). The base installation can be downloaded from a source of virtual machine images (e.g., by system 132 from service 122, from microsoft.com, or from any other appropriate source) and can also be created using original installation media (e.g., using an official Windows ISO file to create a base image). Similarly, one or more base images (or specifications for making such images) can be provided to service 122 by an administrator of enterprise network 110 (i.e., so that service 122 can evaluate malware 130 on behalf of Acme Company in accordance with the types of systems actually deployed in network 110).

In some embodiments, "original virtual machine images" also include images reflecting a base installation of an operating system (e.g., Windows XP SP3) after a major application package has been applied (e.g., Office 2013, requiring additional Gigabytes of changes to a system to install). Using the running example of Acme Company having twelve supported Windows-based system configurations, a total of six "original virtual machine images" could be created and used at 302. I.e., for each of the following combinations: Windows XP+Office 2003, Windows XP+Office 2007, Windows XP+Office 2010, Windows 7+Office 2003, Windows 7+Office 2007, and Windows 7+Office 2010; a virtual machine image can be created and copied to the RAM disk at 302 by installing the base operating system (e.g. Windows 7) and applicable version of Office (e.g., Office 2010) a total of six times to form six original virtual machine images. In other embodiments, such software packages are added as copy-on-write overlays, described in more detail below.

A copy-on-write overlay can be created (in QEMU) with the following example command: qemu-img create -b </path/to/base> -f qcow2 </path/to/overlay>. In this example, a copy-on-write overlay will be created at the location "/path/to/overlay" and will be based on the existing base image located at "/path/to/base." Any differences between the base install (e.g., due to executing the copy-on-write overlay and installing additional software in it) will be stored in "/path/to/overlay." Using this approach, the same six kinds of virtual machine images (i.e., the same six combinations of: Windows XP+Office 2003, Windows XP+Office 2007, Windows XP+Office 2010, Windows 7+Office 2003, Windows 7+Office 2007, and Windows 7+Office 2010) can be created as before, but will ultimately consume considerably less space (and thus less RAM). In particular, three copy-on-write overlays can be created using Windows XP as a base (and then installing each of the three Office versions in the overlays) and also three copy-on-write overlays can be created using Windows 7 as a base (and installing each of the three Office versions in the overlays). As mentioned above, the amount of disk space (and thus RAM disk) consumed using this approach will be significantly less (e.g., 10G for the Windows XP and Windows 7 base images, but only 500M-1G for each of the six copy-on-write overlays reflecting the three versions of office having been installed on top of each of the two operating systems). As will be described in more detail below, additional modifications (e.g., installing specific versions of Internet Explorer and other software) can be done dynamically, in conjunction with the evaluation of samples.

At 304, a first virtual machine instance is initialized as a first copy-on-write overlay. One example of the processing performed at 304 is as follows: A copy-on-write overlay is initialized, using as a (read-only) base, the system configuration to be emulated (e.g., using an image of "Windows 7+Office 2010" located at/path/to/win7office2010). As explained above, the "base" used in initializing the copy-on-write can either be a single base image (i.e. a 10G image of Windows 7+Office 2010) or a copy-on-write overlay. The resulting first virtual machine instance can be used to evaluate a malware sample (e.g., malware 130).

The first virtual machine instance can also be initialized using a hierarchy of images. For example, the first virtual machine instance can be initialized as a copy-on-write overlay of "win7office2010IE9.qcow2," which is a copy-on-write overlay of "win7office2010.qcow2," which is a copy-on-write overlay of a base image of Windows 7 (without Office 2010 installed). In this example, "win7office2010.qcow2" is a file that reflects only those changes made to a base install of Windows 7 when Office 2010 is installed (e.g., after the execution of a command such as "startVM harddisk_file=office2010.qcow2-cdrom "office2010.iso", and consuming ~2G of space once the install is completed). Similarly, "win7office2010IE9.qcow2" is a file that reflects only those changes made to "win7office2010.qcow2" after Internet Explorer 9 is installed (e.g., consuming 200M of space).

At 306, the first virtual machine instance is started and the first sample is executed. Various techniques for providing the sample to the virtual machine instance are provided below. In some embodiments, the sample is executed for a fixed amount of time, such as five minutes. Any changes to the virtual machine will be captured in the copy-on-write overlay file and can be analyzed (e.g., to determine which system files the malware adds, deletes, modifies, or changes when executed). Network traffic associated with the first virtual machine instance can also be analyzed (e.g., using pcap). As will be described in more detail below, in some embodiments, additional modifications/customizations are made prior to executing the sample. For example, additional user software can be installed (e.g., Internet Explorer 9 and/or Java Version 7 Update 25), as can honey or other files, which can help draw out malicious behaviors of the sample (e.g., including data of likely interest to malware, such as a passwords file). Further, various hooks (e.g., kernel hooks and/or user hooks) can be installed to facilitate analysis of the sample.

At 308 and 310, portions 304 and 306 of the process are repeated, with respect to a second virtual machine instance (e.g., using "Windows XP SP3+Office 2007" as the base) and a second sample (e.g. sample 130 or a different sample). The same sample (e.g., sample 130) can be evaluated in parallel across multiple virtual machine instances (e.g., associated with different system configurations). And/or, different samples can be evaluated in parallel across multiple virtual machine instances, at least some of which are the same (e.g., with two Windows XP SP3+Office 2010 instances being used in parallel to evaluate two different samples).

Analysis of the results of emulating the samples are performed. As explained above, conclusions can be made as to whether the samples are malicious, and signatures can be generated for future use. The virtual machine instances can then be abandoned and new instances used to evaluate new samples.

Executing Malware Samples

As explained above, in various embodiments, runtime customizations are made to virtual machine instances prior to executing samples for evaluation. As one example, certain software packages (e.g., Java) are updated very frequently (e.g., with updates occurring once per week). While such packages could be included in the base images described above, in some circumstances, it may be more efficient to install such packages in conjunction with evaluating a given sample. As another example, some software (e.g., Microsoft Access) may only be installed/used by a small subset of employees in an enterprise. Resources (e.g., of system 132) can be conserved by selectively testing samples in environments which include such software.

Figure 4:
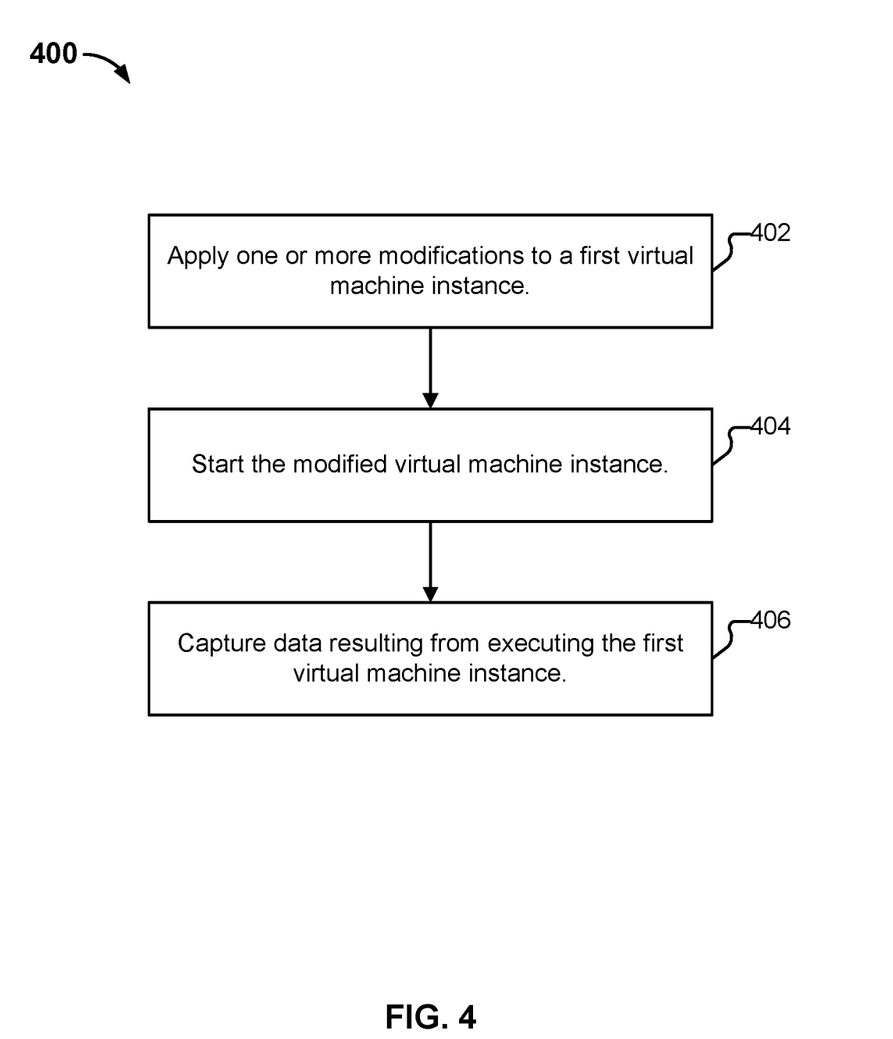
FIG. 4 illustrates an example of a process for evaluating a potentially malicious sample.

FIG. 4 illustrates an example of a process for evaluating a potentially malicious sample. In some embodiments, process 400 is performed on a virtual machine server, such as virtual machine server 124 or virtual machine server 112. In various embodiments, process 400 is performed in conjunction with process 300. As one example, process 400 can be performed prior to, and during portions 306 and 310 of process 300.

The process begins at 402 when one or more modifications are made to a virtual machine instance. As one example, suppose a virtual machine instance, "malware-evaluator1" is initialized at 304 of process 300 as a copy-on-write overlay of an image (whether itself a copy-on-write overlay, or a base image) of a Windows 7 installation that has Office 2010 installed. At 402, modifications are made to malwareevaluator1. One way to make modifications is to open the virtual machine instance and modify it, using a command such as "libguestfs." Other approaches can also be used, as applicable (e.g., depending on which type of virtualization or emulation software is being used by the virtual machine server). As malwareevaluator1 is a copy-on-write overlay of another image, only those changes resulting from the modifications will be stored.

One example of a modification is the inserting of kernel level and/or user level hooks that facilitate analysis of samples. Such hooks may be frequently updated (e.g., by the operator of service 122). Inserting the hooks just prior to execution is efficient, and can also mitigate attempts by malware 130 to determine that it is operating in an instrumented (i.e., hooked) environment.

Another example of a modification is the copying of the malware sample to the virtual machine instance (which, prior to modification, is clean). Other software can also be copied to the virtual machine instance, such as the most current (or previous) versions of Java or other software that updates frequently (or, as mentioned above, is less commonly installed on a system than larger packages such as Office).

Yet another example of a modification is the inclusion in the virtual machine instance of a set of startup instructions. One example of startup instructions is an autoexec.bat file which, when a Windows-based virtual machine instance is started, will be executed as part of the startup process. Similar types of instructions can be created for other types of operating systems, as applicable. One example of instructions that can be included is a set of instructions to install/load additional programs (e.g., install Java). Another example of instructions that can be included is a set of instructions to execute the malware (e.g., where malware 130 is an executable file) or to load the malware (e.g., where malware 130 is a Microsoft Word or PDF document).

Yet another example of a modification is to randomize certain environment values to thwart detection by the malware that it is being operated in a virtualized environment. For example, virtual machine server 112 can be configured to provide virtual machines such as virtual machine 114 with randomized product IDs. As another example, the computer name associated with virtual machine 114 can be randomized. As yet another example, the computer name associated with virtual machine 114 can be set to a very common name, such as "HOME" or "WORKGROUP." As yet another example, the harddrive name can be randomized or set to a very common name. As yet another example, the MAC address can be randomized.

Returning to process 400, at 404 the modified virtual machine instance is started. As explained above, where the modification at 402 includes the installation of startup instructions (e.g., in an autoexec.bat file). Thus, as part of the processing performed at 404, actions such as installing additional software (e.g., Java), and executing the sample will occur.

Finally, at 406 data resulting from the executing of the virtual machine instance is captured. As one example, at 406, any modifications to the filesystem are captured (i.e., where the virtual machine instance is a copy-on-write overlay and the modifications are stored. As another example, at 406, any hooks installed at 402 can report log information (e.g., back to appliance 102) for analysis. As yet another example, at 406, network traffic can be captured and logged (e.g., using pcap).

Analysis of the results of emulating the sample are performed. As explained above, conclusions can be made as to whether the samples are malicious, and signatures can be generated for future use. The virtual machine instance can then be abandoned and new instances used to evaluate new samples.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
copy a respective first and second original virtual machine image to a RAM disk, wherein the respective first and second original virtual machine images correspond, respectively, to first and second base installations;
initialize, as respective first and second copy-on-write overlays, a first virtual machine instance for execution of a sample and a second virtual machine instance for execution of the sample, wherein the first and second virtual machine instances are respectively associated with the first and second original virtual machine images, wherein any changes to the first virtual machine will be captured in a first copy-on-write overlay file, and wherein any changes to the second virtual machine will be captured in a second copy-on-write overlay file;
start the respective first virtual machine instance and second virtual machine instances;
execute the sample inside the first virtual machine instance during a first evaluation period, and at a time occurring during the first evaluation period, execute the sample inside the second virtual machine instance;
determine, based at least in part on an analysis of the respective first copy-on-write overlay file and second copy-on-write overlay file, that the sample acts maliciously when executed in the first virtual machine instance, and that the sample does not act maliciously when executed in the second virtual machine instance; and
take a remedial action with respect to the sample; and
a memory coupled to the processor and configured to provide the processor with instructions.

2. The system of claim 1 wherein the first copy-on-write overlay file indicates changes made to the first virtual machine instance during execution of the first sample, relative to the first original virtual machine image.

3. The system of claim 1 wherein the first virtual machine instance is a copy-on-write overlay of the first original virtual machine image.

4. The system of claim 1 wherein the first virtual machine instance is a copy-on-write overlay of a hierarchy of virtual machine images, wherein the first original virtual machine image comprises the root of the hierarchy.

5. The system of claim 4 wherein the first copy-on-write overlay file indicates changes made to the first virtual machine instance during execution of the first sample, relative to a parent of the first instance in the hierarchy.

6. The system of claim 5 wherein an intermediate node between the root of the hierarchy and the first copy-on-write overlay in the hierarchy comprises a copy-on-write overlay associated with the installation of one or more applications on top of the first original virtual machine image.

7. The system of claim 6 wherein the hierarchy includes a plurality of intermediate nodes, wherein at least some of the intermediate nodes are associated with the installation of different combinations of applications on top of the first original virtual machine image.

8. The system of claim 6 wherein the hierarchy includes a plurality of intermediate nodes, wherein at least some of the intermediate nodes are associated with different versions of the same application.

9. The system of claim 1 wherein executing the first sample includes loading the first sample in an application.

10. The system of claim 1 wherein the first original virtual machine is selected from a plurality of virtual machine images collectively representing a plurality of operating system versions.

11. The system of claim 1 wherein the first original virtual machine is selected from a plurality of virtual machine images collectively representing a plurality of platforms.

12. The system of claim 1 wherein at least one virtual machine image included in the plurality is customized in accordance with a customer specification.

13. A method, comprising:
copying a respective first and second original virtual machine image to a RAM disk, wherein the respective first and second original virtual machine images correspond, respectively, to first and second base installations;

initializing, as respective first and second copy-on-write overlays, a first virtual machine instance for execution of a sample and a second virtual machine instance for execution of the sample, wherein the first and second virtual machine instances are respectively associated with the first and second original virtual machine images, wherein any changes to the first virtual machine will be captured in a first copy-on-write overlay file, and wherein any changes to the second virtual machine will be captured in a second copy-on-write overlay file;

starting the respective first virtual machine instance and second virtual machine instances;

executing the sample inside the first virtual machine instance during a first evaluation period, and at a time occurring during the first evaluation period, executing the sample inside the second virtual machine instance;

determining, based at least in part on an analysis of the respective first copy-on-write overlay file and second copy-on-write overlay file, that the sample acts maliciously when executed in the first virtual machine instance, and that the sample does not act maliciously when executed in the second virtual machine instance; and taking a remedial action with respect to the sample.

14. The method of claim 13 wherein the first copy-on-write overlay file indicates changes made to the first virtual machine instance during execution of the sample, relative to the first original virtual machine image.

15. The method of claim 13 wherein the first virtual machine instance is a copy-on-write overlay of the first original virtual machine image.

16. The method of claim 13 wherein the first virtual machine instance is a copy-on-write overlay of a hierarchy of virtual machine images, wherein the first original virtual machine image comprises the root of the hierarchy.

17. The method of claim 16 wherein the first copy-on-write overlay file indicates changes made to the first virtual machine instance during execution of the sample, relative to a parent of the first instance in the hierarchy.

18. The method of claim 17 wherein an intermediate node between the root of the hierarchy and the first copy-on-write overlay in the hierarchy comprises a copy-on-write overlay associated with the installation of one or more applications on top of the first original virtual machine image.

19. The method of claim 18 wherein the hierarchy includes a plurality of intermediate nodes, wherein at least some of the intermediate nodes are associated with the installation of different combinations of applications on top of the first original virtual machine image.

20. The method of claim 18 wherein the hierarchy includes a plurality of intermediate nodes, wherein at least some of the intermediate nodes are associated with different versions of the same application.

21. The method of claim 13 wherein executing the first sample includes loading the first sample in an application.

22. The method of claim 13 wherein the first original virtual machine is selected from a plurality of virtual machine images collectively representing a plurality of operating system versions.

23. The method of claim 13 wherein the first original virtual machine is selected from a plurality of virtual machine images collectively representing a plurality of platforms.

24. The method of claim 13 wherein at least one virtual machine image included in the plurality is customized in accordance with a customer specification.

25. A computer program product embodied in a non-transitory computer readable storage medium and comprising computer instructions for:

copying a first original virtual machine image to a RAM disk, wherein the first original virtual machine image corresponds to a base installation of a first operating system;

initializing, as a first copy-on-write overlay, a first virtual machine instance for execution of a first sample, wherein the first virtual machine instance is associated with the first original virtual machine image, and wherein any changes to the first virtual machine will be captured in a first copy-on-write overlay file;

starting the first virtual machine instance and execute the first sample inside the first virtual machine instance;

initializing, as a second copy-on-write overlay, a second virtual machine instance for execution of a second sample, wherein the second virtual machine instance is associated with a second original virtual machine image, and wherein any changes to the second virtual machine will be captured in a second copy-on-write overlay file; and starting the second virtual machine instance and execute the second sample inside the second virtual machine instance.

* * * * *

UNITED STATES PATENT AND TRADEMARK OFFICE
CERTIFICATE OF CORRECTION

PATENT NO. : 10,678,918 B1
APPLICATION NO. : 15/890198
DATED : June 9, 2020
INVENTOR(S) : Wang et al.

Page 1 of 1

It is certified that error appears in the above-identified patent and that said Letters Patent is hereby corrected as shown below:

In page 4, Column 2, item (56), other publications, cite no. 14, delete "Zheng et al., "SmartDroid: An Automatic System for Revealing UI-based Trigger Conditions in Android Applications", Oct. 19, 2012." and insert --Zheng et al., "SmartDroid: an Automatic System for Revealing UI-based Trigger Conditions in Android Applications", Oct. 19, 2012.--, therefor.

In page 3, Column 2, item (56), other publications, cite no. 18, delete "Chen et al., Chapter 4: Guarding Against Network Intrusions, Network and System Security, Elsevier Inc., Feb. 2009, 5 pages." and insert --Chen et al., "Chapter 4: Guarding Against Network Intrusions", Network and System Security, Elsevier Inc., Feb. 2009, 5 pages.--, therefor.

Signed and Sealed this
Twenty-fourth Day of November, 2020

Andrei Iancu
*Director of the United States Patent and Trademark Office*